United States Patent [19]

Seto

[11] Patent Number: 4,600,866
[45] Date of Patent: Jul. 15, 1986

[54] MOTOR REVOLUTION SPEED CONTROL DEVICE
[75] Inventor: Kaoru Seto, Chigasaki, Japan
[73] Assignee: Canon Kabushiki Kaisha, Tokyo, Japan
[21] Appl. No.: 721,318
[22] Filed: May 17, 1985

Related U.S. Application Data
[63] Continuation of Ser. No. 501,030, Jun. 6, 1983, abandoned.

[30] Foreign Application Priority Data
Jun. 9, 1982 [JP] Japan .................................. 57-97566

[51] Int. Cl.⁴ .............................................. H02P 5/00
[52] U.S. Cl. ..................................... 318/313; 318/326
[58] Field of Search ................... 318/138, 254 A, 254, 318/307, 313, 326, 329, 439, 480, 490

[56] References Cited
U.S. PATENT DOCUMENTS
4,223,261  9/1980  White .............................. 318/313 X
4,228,396  10/1980 Palombo et al. ................ 318/313 X
4,275,342  6/1981  Kawada et al. .................... 318/490

FOREIGN PATENT DOCUMENTS
54-155375 12/1979 Japan .................................. 318/490
55-74391   6/1980 Japan .................................. 318/490
56-29706   3/1981 Japan .................................. 318/490

Primary Examiner—William M. Shoop, Jr.
Assistant Examiner—Bentsu Ro
Attorney, Agent, or Firm—Fitzpatrick, Cella, Harper & Scinto

[57] ABSTRACT

A motor revolution control apparatus has a motor, a pulse generator, a control device and a microprocessor (CPU, ROM, RAM, etc). A slit disc is mounted on the shaft of the motor. The pulse generator generates pulses corresponding to the number of slits formed in the slit disc. The microprocessor controls each time interval (between the pulse corresponding to a given slit upon a first revolution of the slit disc and the pulse corresponding to the given slit upon a second revolution thereof) to be constant, thereby performing high-precision revolution control regardless of a slit interval error.

14 Claims, 23 Drawing Figures (a)

| FIG. 7A |
| FIG. 7B |

MOTOR REVOLUTION SPEED CONTROL DEVICE

This is a continuation of application Ser. No. 501,030, filed June 6, 1983, now abandoned.

BACKGROUND OF THE INVENTION

1. Field of the Invention

The present invention relates to a revolution control apparatus for controlling motor revolution speed.

2. Description of the Prior Art

Conventionally, two methods are proposed for controlling motor revolution speed as follows. First, a tachometer generator system is proposed wherein a tachometer generator is mounted on a rotating shaft of a motor and an output voltage obtained in proportion to the revolution speed of the motor is set so as to be constant. Second, a revolution pulse system is proposed wherein a slit disc is mounted on a rotating shaft of a motor, and an output pulse having a frequency proportional to the revolution speed of the motor is obtained by a photosensor, a magnetic head or the like so as to keep the pulse period constant. Among these systems, in order to accurately set the revolution speed of the motor and minimize a variation in revolution speed, the revolution pulse system is generally superior to the tachometer generator system. This is because the tachometer generator has low detection precision and a low response to the revolution speed, and is affected by changes in temperature. However, the pulse generator has high detection precision and may not be affected by changes in temperature, thereby providing highly precise motor revolution speed detection. Therefore, the pulse generator is used when a high detection precision is required, whereas the tachometer generator which has a simple construction and results in low cost is used when a low detection precision is needed. Even though the pulse generator provides high detection precision, it has the following drawback.

When the number of slits formed in the slit disc is increased, the number of pulses obtained upon one revolution of the motor is proportionally increased. In principle, revolution speed correction of the motor is performed in proportion to the number of pulses. In this sense, it might be expected that the revolution speed precision would be greatly improved. However, in fact, an interval error occurs between the adjacent slits at the time of manufacture of the slit disc if the number of slits is increased. As a result, the revolution speed precision is generally degraded.

Figure 1:
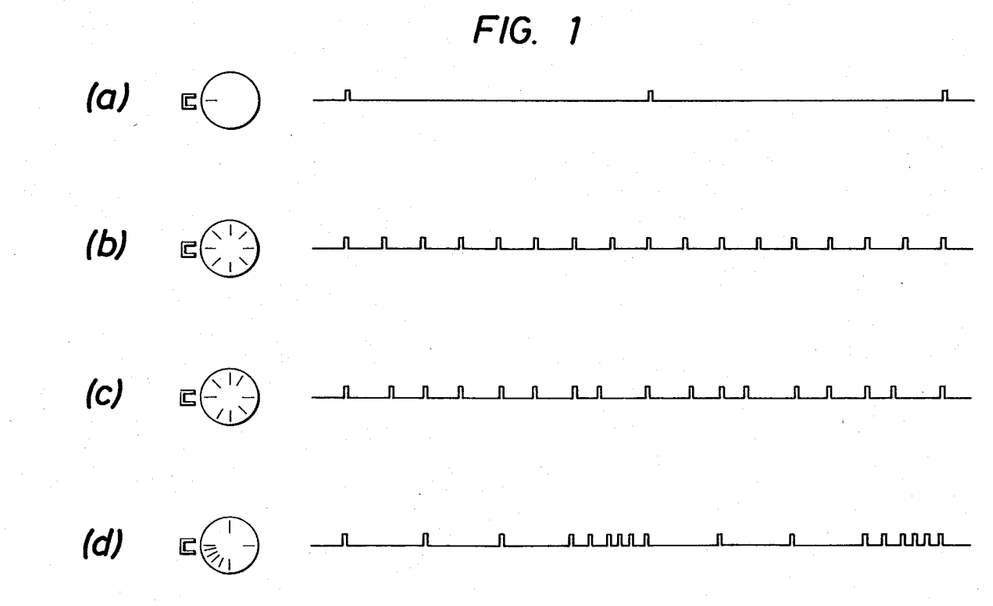
FIG. 1(a) shows the relationship between a slit disc having one slit and its output pulse waveform.
FIG. 1(b) shows the relationship between a slit disc having eight slits and its output pulse waveform.
FIG. 1(c) shows the relationshp between a slit disc having eight slits with a slit interval error and its output pulse waveform.
FIG. 1(d) shows the relationship between a slit disc having eight slits with an extreme slit interval error and its output pulse waveform.

The relationship between the slits and the pulses will be described with reference to the slit discs and output pulses shown in FIGS. 1(a) to 1(d). The slit disc shown in FIG. 1(a) has a single slit. A time interval from a given pulse to the next pulse is always constant. When the revolution speed of the motor is controlled to obtain a predetermined time interval between two adjacent pulses, the motor revolution speed is kept constant. However, it should be noted that speed correction is performed only once during one revolution of the motor. As a result, a speed variation (i.e., jitter) during one revolution may not be compensated for. The slit disc shown in FIG. 1(b) has eight slits. The slits are ideally formed in the disc at equal angular intervals, no interval error is allowed between any two adjacent slits. In this case, error correction is performed 8 times per revolution, so that the jitter described above can be also corrected. However, it is impossible to completely eliminate the interval error between any two adjacent slits because of a lack of precision in the process for manufacturing the slits. In fact, interval errors occur as shown in FIG. 1(c). If the motor revolution speed is corrected with such a disc so as to keep the pulse period constant, it is readily understood that a variation in revolution speed is thus increased. The slit disc shown in FIG. 1(d) has an extreme interval error. Here assume that a Hall motor is used. In general, the Hall motor can be readily driven to increase the revolution speed thereof but is difficult to stop. The revolution speed of the Hall motor is naturally decreased by air resistance or friction loss. In this manner, the Hall motor has a fast response time for increasing the speed, but a very slow response time for decreasing the speed. If the slit disc shown in FIG. 1(d) is used to control the Hall motor, the number of revolutions of the motor is increased at a wide pulse interval and is decreased at a narrow pulse interval. As a result, the average motor speed is substantially determined by the wide pulse intervals. Even if the oscillation frequency precision of a quartz oscillator for measuring the pulse intervals were to be greatly improved, the average motor speed would nevertheless undergo an error corresponding to an unequal interval between two adjacent slits. The average motor speed is thus affected by the precision of the slits, resulting in inconvenience.

SUMMARY OF THE INVENTION

It is an object of the present invention to eliminate the conventional drawback described above.

It is another object of the present invention to provide a motor revolution speed control apparatus for highly precisely controlling the revolution speed of a motor.

It is still another object of the present invention to provide a highly safe motor revolution speed control apparatus.

It is still another object of the present invention to provide a motor revolution speed control apparatus which is not substantially influenced by a slit interval error upon revolution speed control of the motor and which performs a plurality of revolution speed corrections during one revolution of the motor.

It is still another object of the present invention to provide a motor revolution speed control apparatus which has an automatic gain control function for automatically setting an optimum loop gain so as to minimize the revolution speed jitter of the motor; and which has a protective function so as to detect the revolution speed jitter of the motor in accordance with a plurality of detection methods, generate to an outside thereof a warning signal indicating the revolution speed jitter and interrupt a power supply to the motor, so that optimum revolution speed control is performed for any type of motor without modification, using the automatic optimum loop gain setting function.

It is still another object of the present invention to provide a multi-purpose motor revolution speed control apparatus wherein the motor revolution speed is modulation-controlled by a given signal so as to intentionally change the revolution speed of the motor, thereby performing a simulation to examine the influence of the motor jitter on various types of equipment each of which is driven by the motor.

Other objects, advantages and features of the present invention will be apparent from the following description of a preferred embodiment in conjunction with the accompanying drawings.

BRIEF DESCRIPTION OF THE DRAWINGS

FIGS. 1(a) to 1(d) are views showing the relationships between the slits and the pulse waveform with reference to the slit discs and pulses, respectively, in which

DETAILED DESCRIPTION OF THE PREFERRED EMBODIMENT

A motor revolution speed control apparatus according to an embodiment of the present invention will be described with reference to the accompanying drawings.

Figure 2:
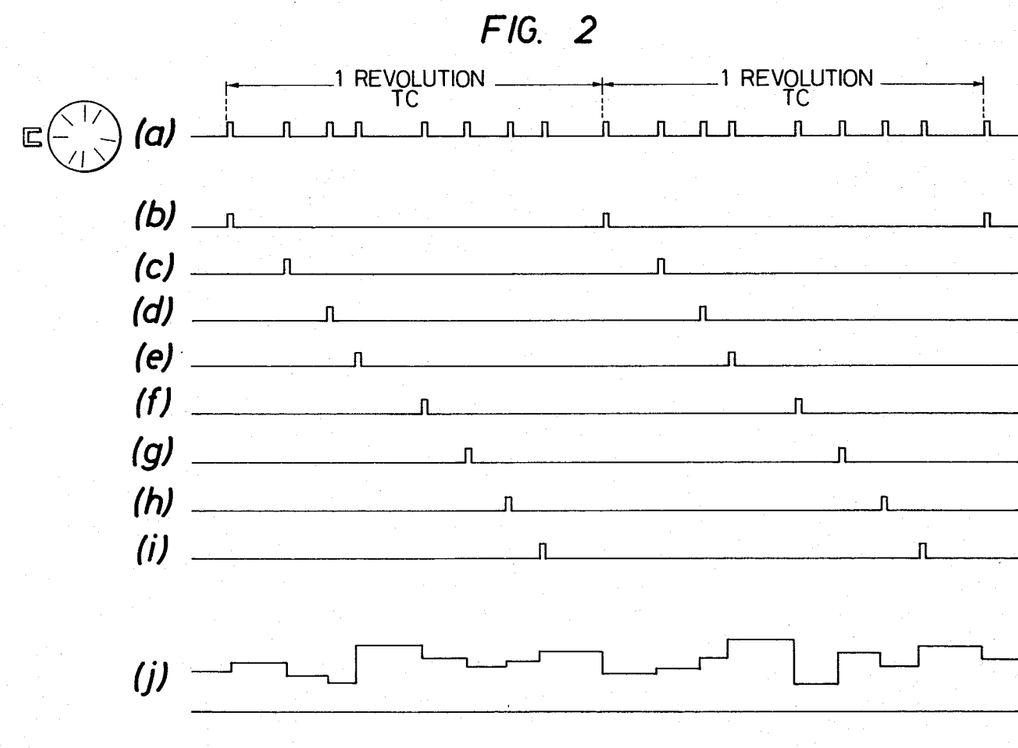
FIGS. 2(a) to 2(j) are views for explaining the principle of revolution speed control of a motor according to the present invention.

FIGS. 2(a) to 2(j) are views for explaining the principle of motor revolution speed control according to the present invention. FIG. 2(a) shows the revolution pulse signal obtained when a slit disc having eight unequal slit intervals is rotated by two revolutions, the slit disc being illustrated together with the revolution pulse signal. The revolution pulses illustrated along the time base upon one revolution of the motor are designated as pulses 1 to 8 corresponding to slits 1 to 8 for illustrative convenience. FIG. 2(b) shows the revolution pulses 1 for the slit 1. In the same manner as described above, the pulses 2 to 8 for the slits 2 to 8 are shown in FIGS. 2(c) to 2(i), respectively.

The revolution of the motor is controlled such that a time interval for one revolution of the slit 1 is given as $T_1$, and a time interval for one revolution of the slit 2 is given as $T_2$. Under these conditions, if the motor is rotated at a constant speed and revolution jitter is eliminated, the time intervals $T_1$ and $T_2$ become equal to a common time interval $T_c$. If, for every one of the slits 3 to 8, the motor revolution speed is controlled such that the given slit's time interval becomes equal to the common time interval $T_c$, the revolution jitter due to an interval error is completely eliminated. In other words, even if the slit interval error is increased, the slit interval error can be eliminated if each slit is rotated by one revolution in the common time interval $T_c$. Furthermore, the revolution corrections are sequentially performed during one revolution every time each one of the pulses 1 to 8 is generated. Therefore, when the number of slits is increased, the revolution jitter during one revolution is minimized. FIG. 2(j) shows a detection voltage signal indicating the motor revolution speed every time each slit passes along the photosensor. Revolution control is performed on the basis of this detection voltage signal.

Figure 3:
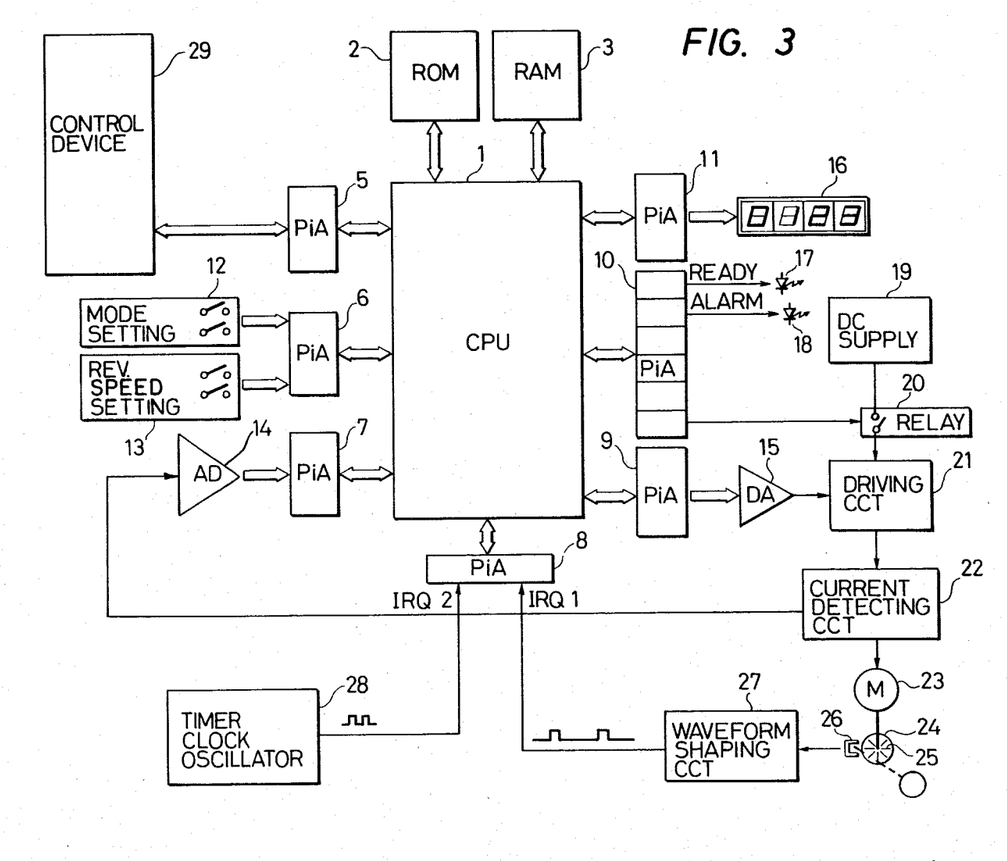
FIG. 3 is a block diagram of a motor revolution speed control apparatus according to an embodiment of the present invention.

FIG. 3 is a block diagram of a motor revolution control apparatus according to the embodiment of the present invention. A CPU (central processing unit) 1 controls the overall operation of the apparatus. A ROM (read-only memory) 2 stores a control program. A RAM (random access memory) 3 has memory areas such as various types of registers and flags which are used for revolution speed control. Bidirectional peripheral interface adapters (to be referred to as a PiAs hereinafter) 5 to 11 which are commercially available serve as input/output interfaces between the CPU 1 and peripheral devices. The PiA 8 is an input interrupt line which is independently controlled. A control device 29 supplies motor start/stop signals and a revolution speed set signal to the CPU 1. The control device 29 may generate mode selection signals to be described later. The control device may comprise a keyboard or the like.

The revolution speed of a motor 23 may be manually set by a DIP (Dual In-line Package type) switch 13. A DIP switch 12 selects one of the following motor control modes; a normal speed mode wherein the motor 23 is controlled at the normal speed, a modulation mode wherein a speed control signal is modulated by another signal to effect a change in motor speed; and an optimum loop gain search mode (to be referred to as a gain automatic setting mode) wherein a change in motor speed is minimized when the loop gain is automatically changed to control the speed of the motor 23. A 4-digit 7-segment LED 16 displays a pulse interval error by a change in motor speed and various types of error codes in numbers. An LED 17 indicates that the revolution speed of the motor 23 falls within a predetermined desired range. An LED 18 indicates the revolution jitter of the motor 23. A DC supply 19 supplies power to a motor driving circuit 21 through a relay 20 controlled by the CPU 1. A D/A converter 15 converts a digital signal for speed control to a corresponding analog signal so as to control the motor driving circuit 21. A current flowing in the motor 23 is detected by a current detecting circuit 22 in the form of a voltage signal. The analog voltage signal is converted by an A/D converter 14 to a digital signal. The CPU 1 fetches this digital signal to monitor the current flowing in the motor 23.

The current detecting circuit 22 comprises, for example, a resistor. A voltage across two ends of the resistor is detected, and a detected voltage is supplied to the A/D converter 14.

A slit disc 24 is mounted on the rotating shaft of the motor 23. Eight slits 25 are formed in the slit disc 24. A photointerrupter 26 generates a pulse when each slit crosses an optical system. The pulse is supplied to a waveform shaping circuit 27. A waveform shaped pulse is then supplied as an interrupt input pulse to the CPU 1 through the input interrupt line or adapter PiA 8. A clock generator 28 as a timer generates an oscillation signal as an interrupted input signal to the CPU 1 through the line PiA 8.

Figure 4:
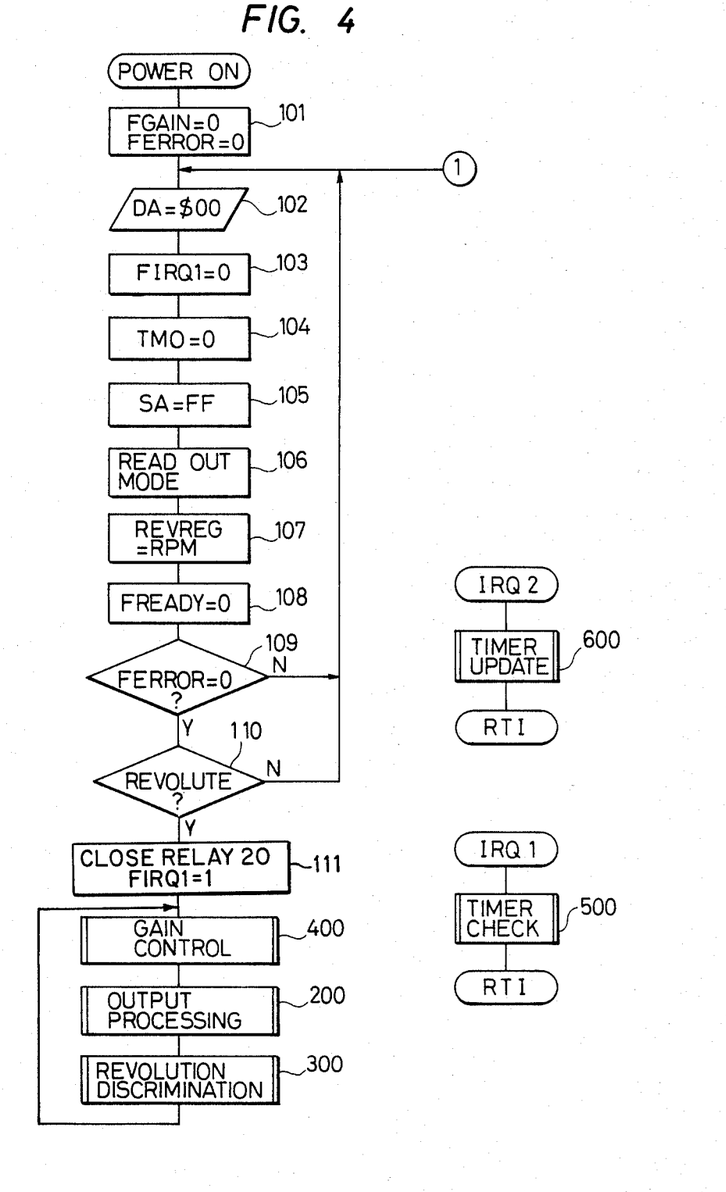
FIG. 4 is a flow chart for explaining the main control routine for the motor revolution control apparatus shown in FIG. 3.

The revolution speed control of the motor in the motor revolution speed control apparatus having the above construction will be described with reference to FIGS. 4 to 9. FIG. 4 is a flow chart for explaining a main control routine of the revolution speed control apparatus shown in FIG. 3. When the apparatus is powered, a gain setting flat FGAIN which is used for servo control of the motor 23 is initialized (cleared to zero) in step 101. An error flag FERROR which is set to indicate the revolution jitter of the motor 23 is also reset to zero to step 101. A data signal $00 (where $ indicates the hexadecimal notation) is supplied to the D/A converter 15 to stop the motor 23 in step 102. In step 103, an interrupt request one flag FIRQ1 is reset to zero so as not to execute a timer routine (to be desired later) for measuring the one-revolution time interval of the slit. In step 104, a timer register TMO for detecting abnormally low speed of the motor 23 is reset to zero. In step 105, an error register SA for storing a time error corresponding to a speed error of the motor is initialized to $FF. A content of the DIP switch 12 for setting the revolution speed control mode of the motor or the mode selection signal from the control device 29 is read out in step 106. Either data is stored in the RAM 3. In step 107, time interval data which is required for one revolution of the motor at the normal speed and which is set by the DIP switch 13 or the control device 29 is stored in a revolution speed register REVREG. In step 108, a ready flag FREADY for indicating that the motor revolution speed falls within a predetermined speed range is cleared to zero. After the initialization procedures described above are completed, it is determined in step 109 whether or not an error in the time interval data set in step 107 is absent. If YES in step 109, the main control routine advances to step 110. It is then determined in step 110 whether or not the motor revolution speed command is supplied from the control device 29. If NO in step 110, the routine returns to step 102 and the initial steps are repeated. However, if YES in step 110, the relay 20 is closed to supply power to the motor driving circuit 21. The routine advances to step 111 wherein the interrupt request one flag is set at "1" so as to execute the timer check routine. When subsequent gain control routine 400, output processing routine 200 and revolution discrimination routine 300 are executed, the motor 23 starts rotation and is accelerated to reach the normal speed. The motor rotation reaches a stable revolution range. At the same time as explained hereinafter in connection with FIG. 5, in timer updating routine 600, each one of all timer registers is increased by one in response to the interrupt signal from the timer oscillator 28. Also as explained hereinafter in connection with FIG. 6, in timer check routine 500, a difference between the time interval of the revolution pulses for one revolution and a predetermined value is obtained in response to the interrupt signal from the photointerrupter 26.

The individual routines will be described in detail with reference to the flow charts.

Figure 5:
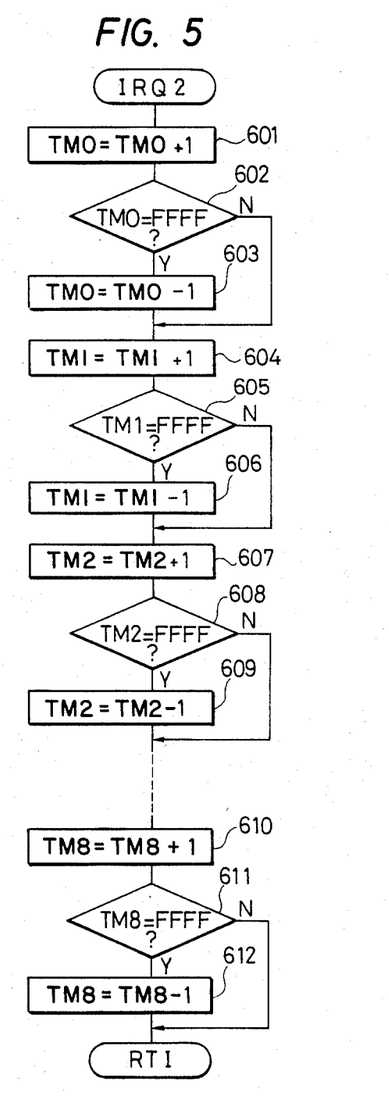
FIG. 5 is a flow chart for explaining an interrupt processing routine of a timer clock.

FIG. 5 is the flow chart of timer updating routine 600. More particularly, this flow chart illustrates an interrupt processing routine when a second interrupt request signal IRQ2 is supplied from the timer clock generator 28 to the CPU 1 through the PiA 8. The interrupt processing is performed at the leading edge of the interrupt request signal IRQ2 synchronized with the oscillation clock from the timer clock generator 28. Timer registers TM0, TM1, ..., and TM8 are assigned in the RAM 3 so as to execute the interrupt processing routine. The timer register TM0 is used to detect revolution jitter when the revolution pulse signal (i.e., the signal IRQ1) from the motor 23 is not supplied for a predetermined time interval. The timer registers TM1 to TM8 are used to measure time intervals taken for the slits 1 to 8 formed in the slit disc 24 to be rotated by one revolution, respectively. Referring to FIG. 5, in step 601, the content of the timer register TM0 is incremented by one. It is determined in step 602 whether or not the content of the timer register TM0 is $FFFF which corresponds to the number of pulses from the clock generator 28 in one revolution of the motor 23 at the speed set by the DIP switch 13 or the control device 29. If YES in step 602, the content of the timer counter TM0 is decremented by one in step 603. However, if NO in step 602, the routine advances to step 604. The above-described operation is thus performed in steps 602 and 603 so as to prevent an overflow. In step 604, the content of the timer register TM1 is increased by one. It is then determined in step 605 whether or not the content of the timer register TM1 is set at $FFFF. If YES in step 605, the content of the TM1 is decreased by one in step 606 so as to prevent overflow. If NO in step 605, the routine jumps to step 607. The same operation as described above is repeated for the timer registers TM2 to TM8 in steps 607 to 612. The interrupt processing routine is then ended.

Figure 6:
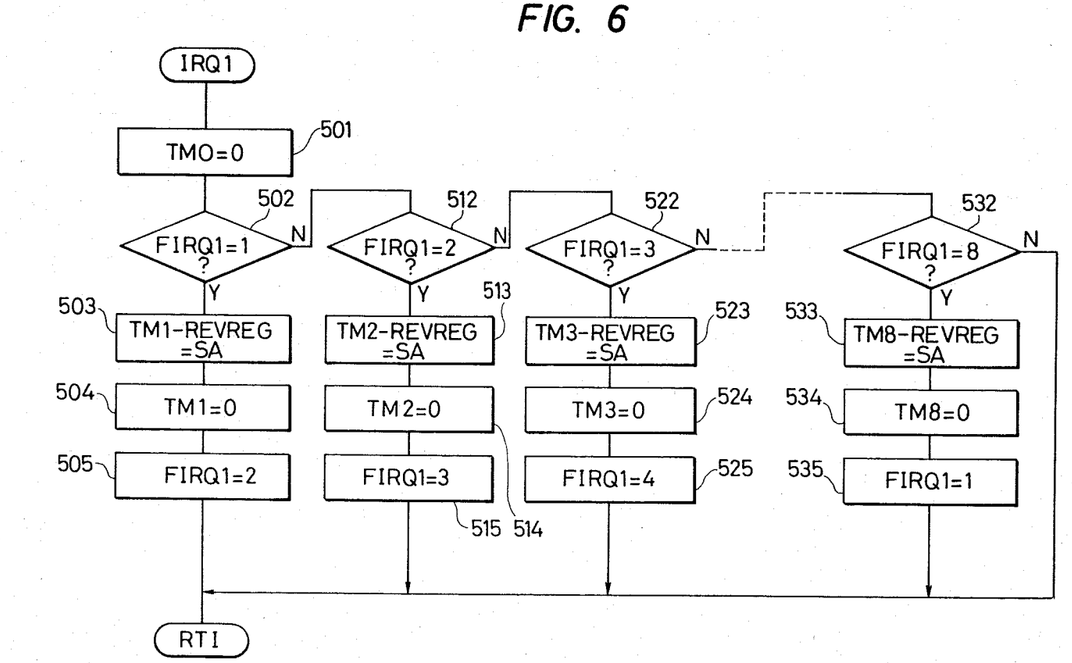
FIG. 6 is a flow chart for explaining an interrupt processing routine of a revolution pulse.

FIG. 6 is a flow chart of timer check routine 500. More particularly, the interrupt processing routine is executed when the first interrupt request signal IRQ1 is supplied from the waveform shaping circuit 27 to the CPU 1 through the PiA 8. This interrupt mode is started at the leading edge of the interrupt request signal IRQ1 synchronized with the revolution pulse from the motor 23. When the first interrupt request signal IRQ1 is received, the content of the timer register TM0 is cleared to zero so as to count the revolution pulse interval in step 501. It is determined in step 502 whether or not the interrupt request one-flag register FIRQ1 for specifying the interrupt processing subroutines of the timer registers TM1 to TM8 is set at "1". If YES in step 502, the interrupt operation of the timer register TM1 is performed. If NO in step 502, the operation of another timer register is performed. Now let the flag FIRQ1 be 1. The flow advances to step 503. A difference between the content of the timer register TM1 and the time value of the register REVREG which corresponds to a desired revolution speed (the predetermined revolution speed in the normal mode; or a variable revolution speed number which sequentially changes in the modulation mode) is computed. A subtracted result is stored in the error register SA. In step 504, the content of the timer register TM1 is cleared to zero so as to measure the one-revolution time interval. The routine advances to step 505 wherein the content of the interrupt request one flag FIRQ1 is updated to "2". The interrupt processing routine is then ended. Upon revolution of the motor 23, if the first request signal IRQ1 synchronized with the revolution pulse corresponding to the slit 2 is received (if NO in step 502), the routine advances to step 512. It is determined in step 512 whether or not FIRQ1=2. If YES in step 512, the routine advances to steps 513 and 514 where the interrupt operation of the timer register TM2 is performed. In step 515, the content of the flag FIRQ1 is updated to "3". The interrupt processing routine is thus ended. In the same manner as described above, upon each one revolution of the motor 23, the interrupt operation of the subsequent timer registers corresponding to the respective slits is performed.

Figure 7:
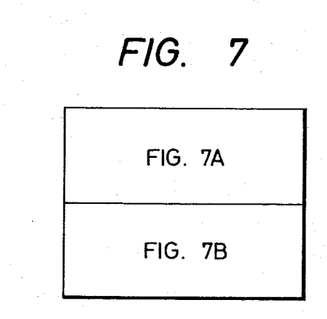
FIGS. 7A and 7B are combined as FIG. 7, and show flow charts for explaining a gain control routine.
Figure 7A:
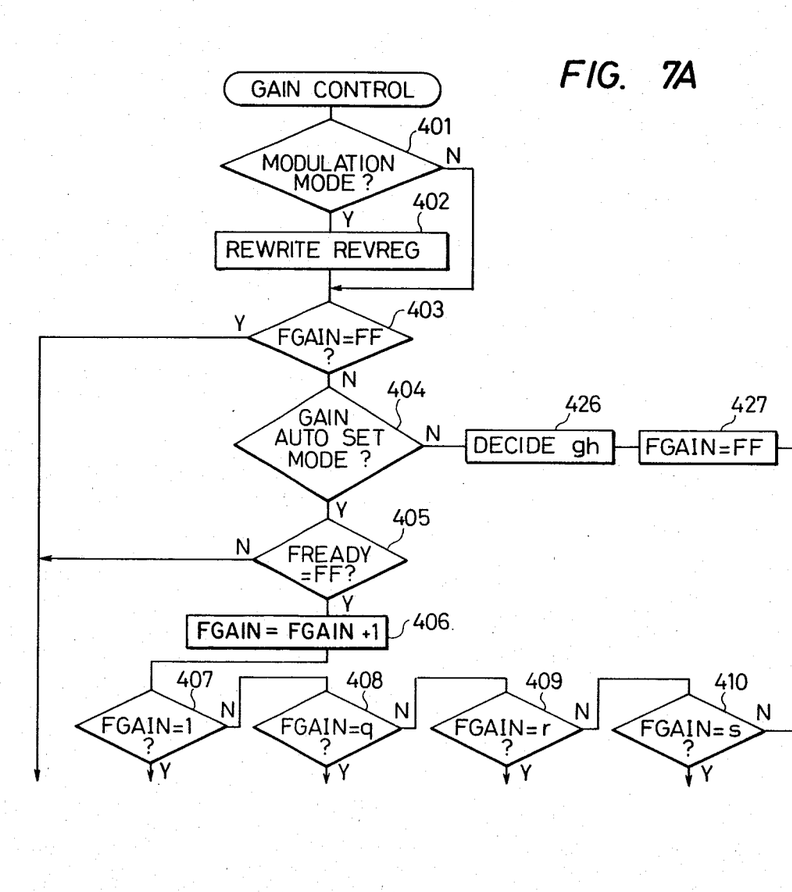
Figure 7B:
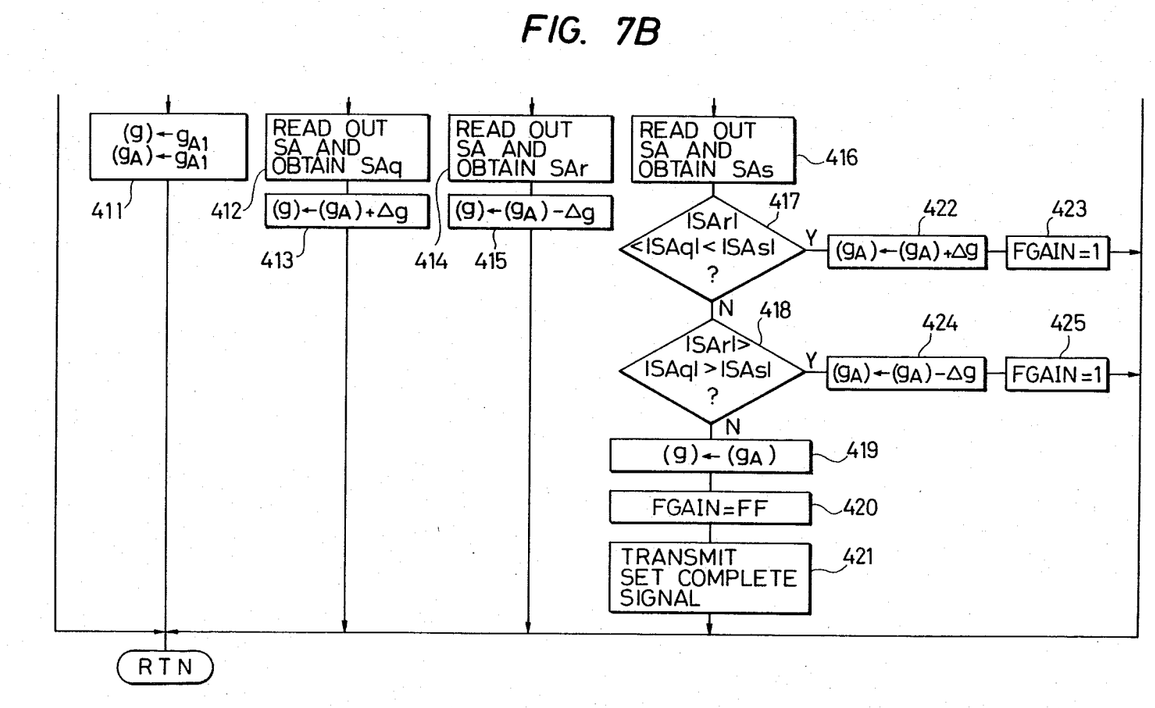

FIGS. 7A and 7B are flow charts of the gain control routine 400 of the software servo revolution control. It is first determined in step 401 whether or not the revolution mode is set in the modulation mode. If YES in step 401, the content of the revolution speed register REVREG is updated in step 402. in other words, the time data corresponding to the desired revolution speed are sequentially updated. The software servo system controls the revolution speed of the motor so as to minimize a difference between the revolution speed and the updated time data. For example, since the content of the register REVREG is updated from time to time in accordance with the envelope of the given signal, the resulting change in motor speed is thereby intentionally modulated, thus operating the apparatus in the modulation mode.

The content of the register REVREG can be updated over time in the following manner. First, the revolution signals (time values corresponding to revolution speed) supplied from the control device 29 through the PiA 5 are sequentially written in the register REVREG. Second, the revolution data is prestored in the ROM 2. The revolution data (time values corresponding to the desired revolution speed) are sequentially read out from the ROM 2 at every predetermined time interval. In this case, the operation result may be written in the register REVREG. The predetermined time interval can be obtained by counting the pulse signals from the clock generator 28.

Referring again to the flow charts in FIGS. 7A and 7B, if NO in step 401, the routine bypasses step 402, so that the register REVREG stores the initial data. It is then discriminated in step 403 whether or not the content of the flag GAIN is $FF. If YES in step 403, it indicates that the optimal gain is already set. The flow for setting the optimal gain is not executed in this case. However if NO in step 403, the content of the gain flag FGAIN is cleared to zero. The routine thus advances to step 404. It is then determined in step 404 whether or not the gain automatic setting mode is set. If NO in step 404, the routine advances to step 426. In step 426, a time value h corresponding to an allowable tolerance of a change in speed with respect to the desired revolution speed as a center frequency is measured. At the same time, a gradient g of a gain optimal for servo control within the allowable range of tolerance is also determined. It should be noted that the time value h and the gain gradient g are determined with reference to the data table in the ROM 2 in accordance with the content of the register REVREG. In step 427, data $FF is stored in the gain flag FGAIN to indicate the end of optimal gain setting. If YES in step 404, the routine advances to step 405. It is then determined in step 405 whether or not the content of the ready flag (to be described in detail later) FREADY is set to be $FF. If NO in step 405, the motor revolution speed has not reached a stable condition. In this condition, the gain operation is not yet performed. When the motor revolution speed becomes stable and the condition in step 405 is satisfied, the routine advances to step 406. In step 406, the content of the gain flag FGAIN is increased by one. It is then determined in step 407 whether or not the content of the gain flag FGAIN is 1. Since this condition is satisfied, the routine advances to step 411. In step 411, the gain gradient is set to a predetermined optimal gain gradient $g_{A1}$. The gradient $g_{A1}$ is stored in a gain register g and an optimal gain register $g_A$ used to search the optimum gain to be described later. It should be noted that the gradient $g_{A1}$ of the gain which is set in step 411 can be determined in accordance with either the content of the register REVREG or the value used in step 426. When step 407 is executed again, the condition is not satisfied this time since the content of the gain flag FGAIN is increased to "2". Similarly, steps 408 to 410 are not satisfied, so the operations in steps 408 to 410 are not performed. In other words, revolution speed control is performed using the gradient $g_{A1}$ of the gain. In the qth flow wherein the motor revolution speed is stabilized, in step 408, it is satisfied that the content of the gain flag FGAIN is set to be "q". In step 412, the content of the error register SA at this moment is read out to obtain a value $SA_q$. The value $SA_q$ is stored in the RAM 3. In step 413, the gradient of the gain is increased by a given value $\Delta g$. By this operation, the value $g_{A1}+\Delta g$ is stored in the gain register g. Furthermore, in the rth flow wherein the motor revolution speed is stabilized with respect to the updated gain, the content of the gain flag FGAIN satisfactorily corresponds to r. In step 414, the content of the error register SA at this moment is read out to obtain a value $SA_r$. This value is then stored in the RAM 3. In step 415, the gain gradient is decreased by $2\Delta g$. In other words, the operation $(g) \leftarrow (g_{A1}+\Delta g)-2\Delta g = g_{A1}-\Delta g$ is performed to continue revolution speed control. Finally, in the sth flow, it is satisfied that the content of the gain flag FGAIN is s. The routine advances to step 416 wherein the content of the error register SA is read at this moment to obtain its value $SA_s$. The value $SA_s$ is stored in the RAM 3. It is determined in step 417 whether or not the inequality $|SA_r| < |SA_q| < |SA_s|$ is established using the absolute values of the errors obtained in the three gain setting conditions. If YES in step 417, the gradient $g_{A1}+\Delta g$ is used instead of the gradients $g_{A1}$ and $g_{A1}-\Delta g$ to decrease the error. In step 422, the operation of letting the content of the optimum gain register $g_A$ be $(g_A)+\Delta g$ is performed. In other words, the central value of the gain which is the reference value in the optimum gain setting routine is increased by $\Delta g$. The updated content of the optimum gain register $g_A$ is stored in the gain register g. In step 423, the content of the gain flag FGAIN is reset to 1, and the flow is ended. While the gain setting routine is executed again, it is determined in step 418 whether or not the inequality $|SAr| > |SAq| > |SAs|$ is established. If YES in step 418, a gain which is smaller than the gain stored in the optimum gain register $g_A$ by $\Delta g$ must be used to minimize the error. In step 424, the operation of let the content of the optimum register $g_A$ be $(g_A)-\Delta g$ is performed. The updated content of the optimum gain register $g_A$ is stored in the gain register g. In step 425, the gain flag FGAIN is reset to 1. The above operation is repeated. If NO in step 417 and NO in step 418 (i.e., when a minimum error occurs using the gain data stored in the optimum gain register $g_A$), the flow advances to step 419. The content of the optimum gain register $g_A$ is stored in the gain register g. In step 420, data $FF is stored in the gain register FGAIN so as to indicate the end of gain setting, and a gain set complete signal is produced in step 421 to end the flow.

Figure 8:
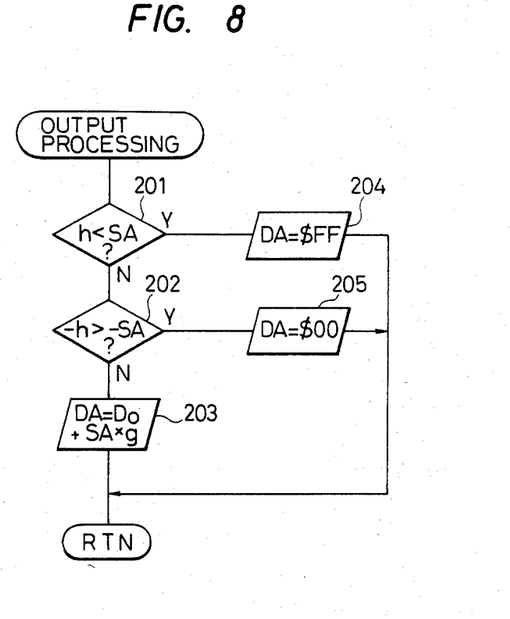
FIG. 8 is a flow chart for explaining an output processing routine.

FIG. 8 is a flow chart of the output processing routine 200 for producing a digital control signal to the D/A converter 15 which controls the speed of the motor 23. In the main control routine shown in FIG. 4, the time value required for one revolution in accordance with the desired revolution speed of the motor is stored in the revolution speed register REVREG. An allowable range of speed variation with respect to the desired speed is provided, and corresponding time values ±h (+h indicates that the present speed is lower than the desired speed; and −h indicates that the present speed is higher than the desired speed) is given by the gain control routine shown in FIG. 7. In the interrupt procressing routine in FIG. 6, a difference (TMn−REVREG where n=1 to 8) between the content of the register REVREG and the time value required for one revolution of each one of the eight slits is obtained, and data indicating this difference is stored in the error register SA. In the output processing routine described below, the content of the error register SA is compared with the allowable range ±h, and a corresponding digital control signal is supplied to the D/A converter. It is determined in step 201 whether or not the revolution speed of the motor is lower than a velocity which falls in the allowable range. If YES in step 201, the data $FF is supplied to the D/A converter 204 so as to maximize a current flowing through the motor 23, thereby quickly increasing the revolution speed of the motor. If NO in step 201, the flow advances to step 202, where it is determined whether or not the present revolution speed exceeds an upper limit of the allowable range. IF YES in step 202, the minimum data $00 is supplied to the D/A converter in step 205 so as to stop the supply of current to the motor. However, if NO in step 202, the motor is rotated within the allowable range. Therefore, in step 203, data obtained by adding a product of the content of the error register SA and the gradient g of the gain to constant data $D0 is used to servo-control the present speed to reach the desired revolution speed.

Figure 9:
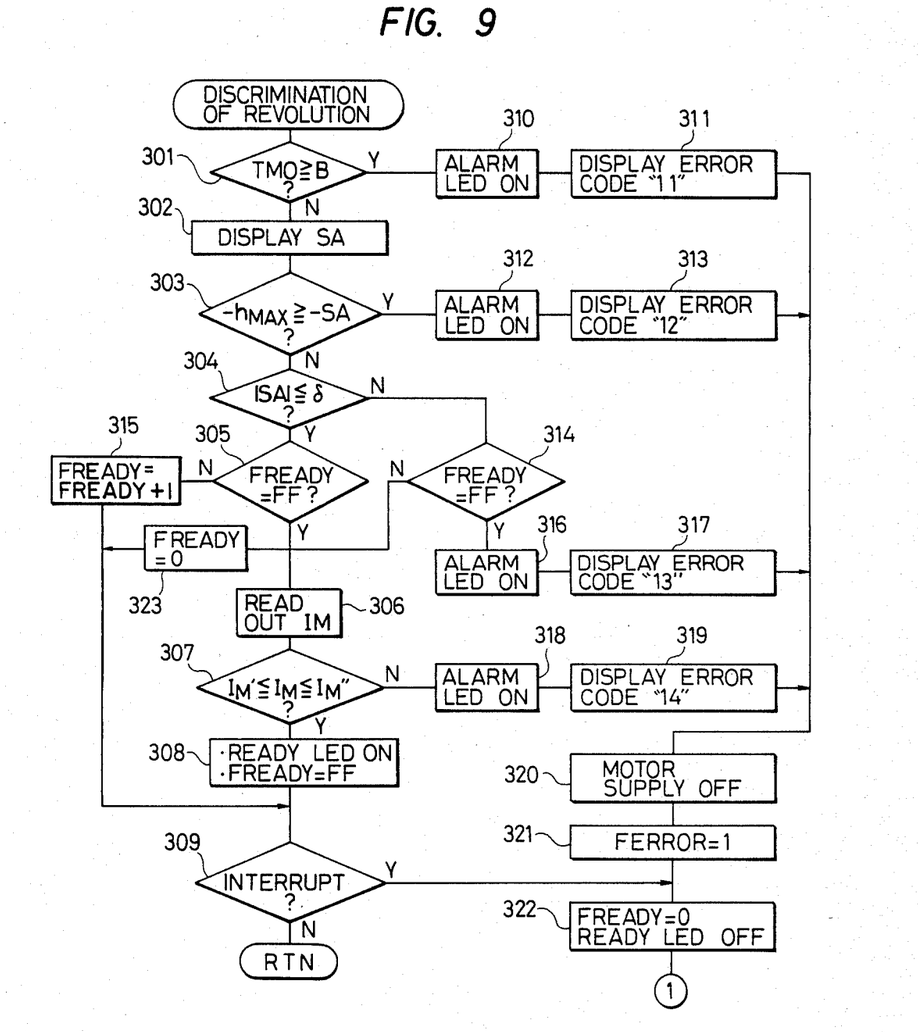
FIG. 9 is a flow chart for explaining a revolution discrimination routine.

FIG. 9 is a flow chart of the revolution discrimination routine 300 for monitoring the revolution condition of the motor. It is discriminated in step 301 whether or not the content of the timer register TM0 for monitoring the eight slit intervals exceeds upper limit data $B. If YES in step 301, it means that the motor is rotated at an abnormally low velocity. The flow advances to step 310 to turn on the alarm LED 18. In step 311, an error code "11" is displayed at the display LED 16. However, if NO in step 301, the flow advances to step 302. In step 302, a time value corresponding to an error between the present revolution speed and the desired revolution speed is displayed. There is provided a means for detecting abnormal revolution speed of the motor. More particularly, in step 303, it is determined whether the error −SA in the time required for one revolution of the given slit (under the condition that the present speed is lower than the normal speed) is lower than an allowable value −h$_{MAX}$. If YES in step 303, the motor is rotated at a high speed which exceeds the safe revolution speed number. In step 312, the alarm LED 18 is turned on. Furthermore, in step 313, an error code "12" is displayed. However, if NO in step 303, the flow advances to step 304. It is determined in step 304 whether or not the revolution speed of the motor falls within a small allowable range with respect to the desired revolution speed. If YES in step 304, the content of the ready flag FREADY is checked. Since the ready flag FREADY is reset to zero in the main control routine shown in FIG. 4, it is determined to be NO in this step. The flow then advances to step 315 wherein the content of the ready flag FREADY is increased by one. The content of the ready flag FREADY is updated every time the condition in step 304 is satisfied. In step 305, if FREADY=FF, it is determined that the motor is stably rotated at the normal speed. In step 306, a current flowing in the motor through the A/D converter 14 is read. It is then determined in step 307 whether or not the current falls within an allowable range. If NO in step 307, the alarm LED goes on in step 318, and an error code "14" is displayed in step 319. However, if YES in step 307, the ready LED goes on in step 308, and data $FF is stored in the ready flag FREADY to indicate that the motor is set in the ready mode. When it is determined in step 304 that the revolution speed of the motor exceeds the allowable range, it is determined in step 314 whether or not the content of the ready flag FREADY is $FF. If NO in step 314, it is determined that the motor is not stably rotated. In step 323, the content of the ready flag is reset to zero. However, if YES in step 314, it is determined that the revolution speed changes after the motor becomes stable. The alarm LED goes on in step 316, and an error code "13" is displayed in step 317. In the flow described above, when the error codes are displayed, step 320 must always be executed. In step 320, the relay 20 is opened to interrupt the supply of power to the motor. In step 321, the error flag FERROR is set. Furthermore, the ready flag FREADY is reset in step 322, and the ready LED goes off. Thereafter, the main control routine shown in FIG. 4 is executed to stop the motor. In the above embodiment, the time interval required for one revolution of the slit is measured to perform revolution control. However, revolution control may be performed under the assumption that a time interval of n revolutions of the slit is constant where n is integer.

According to the embodiment described above, even if a plurality of slits are formed in the disc, revolution control is properly performed regardless of slit interval errors. Furthermore, the correction of changes in velocity may be performed corresponding to the number of slits upon one revolution of the motor, so that revolution jitter can be minimized. In addition to the above advantage, the loop again can be automatically set to minimize revolution jitter of the motor when the motor is started. Therefore, even if the electric characteristics of the motor and the motor driving circuit vary, and the characteristics of the motor deteriorate over time, the optimal gain is always set, thereby minimizing revolution jitter. Furthermore, since the degree of revolution jitter can be displayed in numbers, the revolution condition of the motor can be readily monitored. The display is also utilized to evaluate the characteristics of the motor. There is also provided a motor revolution speed monitoring function. This function provides the ready signal indicating that the motor has reached the predetermined revolution speed range at its start, the alarm signal indicating that the revolution jitter exceeds the predetermined value, the alarm signal indicating that the motor is rotating at an abnormally high speed, the alarm signal indicating that the motor is rotating at an abnormally low speed, and the alarm signal indicating that the current flowing in the motor falls outside the predetermined range in the normal speed mode of the motor. A power-off function is provided to detect the alarm signals so as to automatically interrupt the supply of power to the motor. This function provides the following advantage: when the revolution speed of the motor controlled to have the minimum revolution jitter exceeds the given limit, abnormal revolution can be detected even if the power load mechanism and bearings of the motor deteriorate over time. The supply of power to the motor can be interrupted, thereby preventing burnout of the motor and hence an accident. Furthermore, the speed of the motor can be intentionally changed using a given signal, and the magnitude and frequency of the revolution speed change can be selected as needed, thereby obtaining a desired level of revolution jitter. This can be effectively utilized when a simulation is performed wherein revolution jitter is intentionally produced in a scanner motor for optically scanning a laser beam printer. In addition to this advantage, the timer clock signal and the revolution pulse signal which are the main timing signals of the present invention are supplied to the input interrupt line of the main control microprocessor. Therefore, highly precise timing can be obtained without using a complex circuit arrangement.

The present invention can be effectively used for a motor such as a laser beam printer scanner motor which requires highly precise revolution control.

The present invention is not limited to the particular embodiment described above. Various changes and modifications may be made within the spirit and scope of the appended claims of the present invention.

What is claimed is:

1. A motor revolution speed control apparatus comprising:
    a motor;
    means for generating 1st through Nth signals each comprising a sequence of pulses spaced according to a predetermined revolution of said motor; said pulses of said first signal being irregular due to interval errors with respect to the pulses in each of the other signals;
    means for setting a time period corresponding to a revolution speed of said motor;
    control means for controlling the revolution speed of said motor according to said setting means;
    the control means being constructed and arranged to control the motor speed such that the time period between specific two pulses of each of said signals is substantially equal to the time period which corresponds to the revolution speed set by the setting means.

2. An apparatus according to claim 1 wherein said signal generating means includes a slit disc rotating in synchronism with the revolution of said motor, said slit disk having N slits.

3. An apparatus according to claim 1, wherein said motor is controllable according to a first control mode and a second control mode and wherein said control means is operable to control said motor in each of said first and second control modes.

4. An apparatus according to claim 1 further comprising indicating means for indicating when a revolution speed of said motor reaches a predetermined revolution speed range.

5. An apparatus according to claim 1, further comprising warning means for indicating an abnormal revolution speed of said motor.

6. An apparatus according to claim 1, further including means for displaying information relating to the revolution speed of said motor.

7. A motor revolution speed control apparatus comprising:
    a motor;
    means for setting a revolution speed of said motor;
    detection means for detecting the revolution speed of said motor; and
    control means for controlling the revolution speed of said motor in accordance with the outputs from said detection means,
    said control means being operable to compare the revolution speed set by said setting means with the revolution speed detected by said detection means and form an error signal on the basis of the comparison result, and to control the revolution speed in response to the error signal;
    wherein said control means has a first mode in which a first loop gain is set, said motor is rotated in accordance with the first loop gain and a first error signal corresponding to the first loop gain is detected, and a second mode in which a second loop gain is set, said motor is rotated in accordance with the second loop gain and a second error signal corresponding to the second loop gain is detected; and
    wherein said control means selects the first or second loop gain corresponding to the lower of said first and second error signals detected in said respective first and second modes and rotates said motor in accordance with said selected loop gain.

8. An apparatus according to claim 7 further comprising means for selecting one of a first mode for controlling the revolution speed of said motor with a predetermined level of said loop gain and a second mode for automatically controlling the revolution speed of said motor with an optimum level of said loop gain.

9. An apparatus according to claim 7, wherein said detection means includes means for generating first through Nth serial signals in accordance with the rotation of said motor.

10. An apparatus according to claim 7, further including means for displaying information relating to the revolution speed of said motor.

11. A motor revolution control apparatus comprising:
    a motor;
    detection means for detecting the revolution speed of said motor;
    setting means for setting the revolution speed of said motor; and
    control means for controlling the revolution speed of said motor in accordance with the outputs from said detection means so as to rotate said motor at the revolution speed set by said setting means,
    said control means including means for changing a gain of said control means in accordance with the revolution speed set by said setting means independently of the load on the motor.

12. An apparatus according to claim 11 wherein said control means includes means for setting an optimum loop gain with respect to the revolution speed set by said setting means in accordance with outputs from said detection means.

13. An apparatus according to claim 12 wherein said control means is operable to compare the revolution speed set by said setting means with the revolution speed detected by said detection means and produce an error signal, and to set a loop gain of said apparatus in accordance with said error signal.

14. An apparatus according to claim 11, further including means for displaying information relating to the revolution speed of said motor.

* * * * *